United States Patent
Carey et al.

[15] 3,668,512
[45] June 6, 1972

[54] AUTOMATIC VOLTAGE BOOSTER

[72] Inventors: James Carey, 306 Lee Avenue, Yonkers, N.Y. 10705; Jay E. Citrin, 280 Ocean Parkway, Brooklyn, N.Y. 11218

[22] Filed: May 12, 1971

[21] Appl. No.: 142,622

[52] U.S. Cl..............................323/45, 307/130, 323/50, 323/62
[51] Int. Cl. ............................................................G05f 5/00
[58] Field of Search..................307/17, 130; 323/43.5 R, 50, 323/45, 57, 62; 336/148, 155

[56] References Cited

UNITED STATES PATENTS

| | | | |
|---|---|---|---|
| 2,063,693 | 12/1936 | McCarty | 323/50 X |
| 3,419,790 | 12/1968 | Guhn | 323/43.5 R |
| 2,415,712 | 2/1947 | St. Palley | 323/43.5 R |
| 2,645,725 | 7/1953 | Miller | 323/45 UX |
| 2,830,253 | 4/1958 | Sleeper, Jr. | 323/43.5 R |
| 2,994,030 | 7/1961 | Diebold | 323/45 |

Primary Examiner—A. D. Pellinen
Attorney—Polachek & Saulsbury

[57] ABSTRACT

An instantly acting automatic voltage booster employing autotransformers each having a secondary winding connecting between power supply lines and a load in a three phase system for supplying power continuously to the load. Primary windings are maintained in short circuited condition by contacts of a relay actuated when voltage supplied via the supply lines remains above a predetermined minimum magnitude. The relay contacts open to energize the primary windings and induce voltage in the secondary windings when the supplied voltage falls to or below the predetermined magnitude for maintaining voltage supplied to the load above the predetermined magnitude. A switch is provided to short circuit the secondary windings and open circuit the primary windings in the event of equipment failure.

5 Claims, 2 Drawing Figures

AUTOMATIC VOLTAGE BOOSTER

This invention concerns an instantly acting automatic voltage booster apparatus adapted for maintaining specified voltage supplied to a load from a power supply upon a drop of the voltage of the power supply.

It has lately become the practice of public utilities to lower the voltage of electric power supplied to the public when energy demand becomes excessive. Certain apparatus such as electronic computers cannot withstand a reduction in excess of 3 percent of the voltage supplied to a data processing unit without serious disruption of operations requiring shutdown of the equipment. Other apparatus such as automatic electronic controls of building elevators become extremely erratic when the power supplied by the utility drops as much as 5 percent rendering the operation of the elevator systems correspondingly erratic.

Voltage regulator and control devices are known which can serve to restore the voltage supplied to a load when the voltage supplied by the public utility drops. However, the known devices have several disadvantages. In general, they cannot be used effectively for computer apparatus because of inherent time delay in operation. This time delay may range from 1/1200th of a second for the fastest operating voltage control devices known up to ten seconds or more for motor operated voltage control devices. Such time delays are unacceptable for electronic computer operations where any discontinuance of power or delay in regulation disrupts operation of the computer system. A further disadvantage of prior rapid response voltage regulators is their limited power handling capacity, being limited to approximately 15 KVA. Other objections are their complexity and high cost.

The present invention is directed at overcoming the above and other difficulties and disadvantages of prior voltage regulators by providing a voltage booster which operates instantaneously without any interruption of power supplied to a load. The present device can be made in any desired size up to and beyond 15 KVA. The device is relatively simple in construction. For a device of any given power handling capacity, its cost will be only a minor fraction of the cost of any presently known type of voltage regulator. Installation is simple and can be quickly effected. The device can be employed to protect air conditioner installations, fluorescent lighting installations and other power utilizing systems.

According to the invention there is provided a voltage booster unit employing a pair of autotransformers constantly connected between the power input terminals and load in a three-phase power supply circuit. An electromagnetic relay in the unit is arranged to effect magnetization of the transformers when the input voltage drops a predetermined amount. Operation is instantaneous without any discontinuity in power supplied to the load. The device is particularly well adapted for installation in three-phase systems. However, it can easily be adapted to operate in a single phase system to maintain voltage supplied to a load at a predetermined magnitude.

Other and further features, objects and advantages of the invention will become apparent from the following detailed description taken together with the drawing, wherein.

Figure 1:
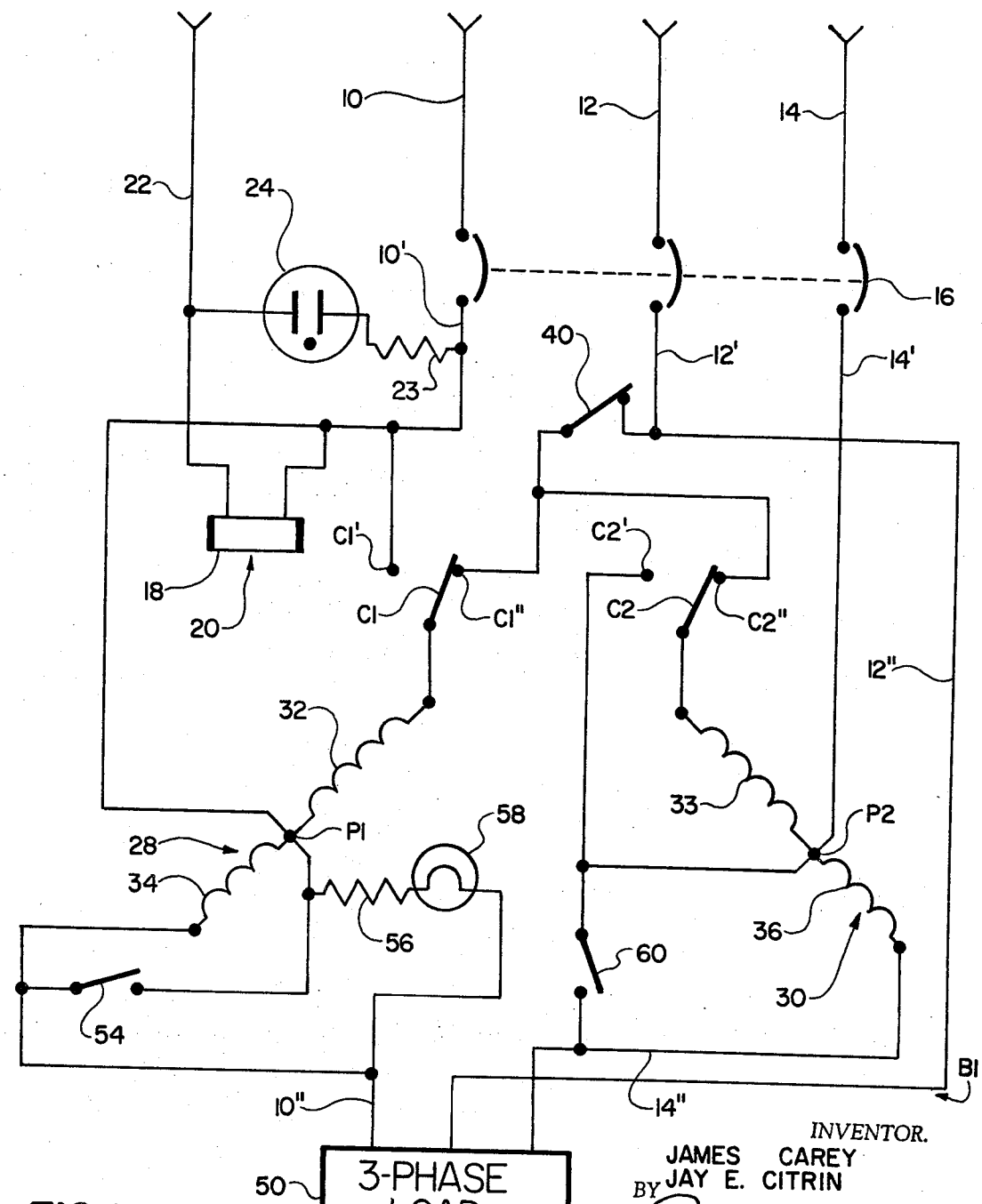
FIG. 1 is a schematic diagram of an automatic voltage booster.

Referring first to FIG. 1, three-phase A.C. power is supplied from mains 10, 12 and 14 of a public utility to a main circuit breaker 16 in circuit B1. Input lines 10', 12' and 14' respectively are connected to the circuit breaker. Coil 18 of an undervoltage sensitive relay 20 is connected between one input line 10' and neutral line 22. A neon lamp 24 is connected across the coil 18 between line 10' and line 22 to indicate that power is on and supplied to the relay when the circuit breaker is closed. A series current limiting resistor 23 allows the limitation of the voltage potential to the desired level.

Relay 20 has two poles or movable contacts C1, C2, operated in a double throw arrangement with fixed contacts C1', C1" and C2', C2" respectively. Contacts C1, C1' and C2, C2' are normally open when the relay coil is not energized, and contacts C1, C1" and C2, C2" are closed. Two autotransformers 28 and 30 are provided. Transformer 28 has a primary winding 32 and secondary winding 34. Transformer 30 has a primary winding 33 and secondary winding 36. Contact C1 is connected to one end of primary winding 32. Contact C1' is connected with line 10' to junction point P1 of primary and secondary windings 32 and 34 respectively. Contact C1" and contact C2" are connected to normally closed manually operable switch 40. Contact C2 is connected to one end of transformer primary 33. Contact C2' is connected to junction point P2 of primary and secondary 33, 36. Switch contact set 40 is connected to power line 12" which is one of three output lines 10", 12", 14" supplying power to the three-phase load 50. Line 12" is connected to line 12'. The free end of secondary winding 34 is connected to line 10" and the free end of secondary winding 36 is connected to the load via line 14". A normally open manually operable switch contact set 54 is connected across secondary winding 34 between point P1 and line 10". A resistor 56 and lamp 58 in series are connected between junction point P1 and line 10". A normally open manually operable switch contact set 60 is connected across secondary 36 between junction point P2 and line 14".

In operation of the device illustrated schematically by circuit B1 in FIG. 1, power is applied through main circuit breaker 16 to coil 18 of relay 20. This relay is set or adjusted to energize coil 18 sufficiently to close contacts, C1, C1' and C2, C2' when the voltage applied via input lines 10, 12, 14 is at or above a predetermined magnitude. At the same time contacts C1, C1" and C2, C2" open. The closing of contacts C1, C1' and C2, C2' short circuits the primary windings 32, 33 of transformers 28, 30 and reflects a low impedance condition to the secondary windings 34, 36. In this condition power flows through the secondary windings at neither boosted nor reduced voltage and is applied to the load 50 via power output lines 10", 12" and 14". When the voltage input drops to a predetermined level, for example 1 percent of normally supplied voltage, coil 18 of undervoltage relay 20 is in effect deactivated and operates to set the contacts to the position shown in FIG. 1. Contacts C1, C1' and C2, C2' open removing the short circuit condition of primary windings 32, 33. Contacts C1, C1" and C2, C2" close. A magnetizing voltage is then applied across primary windings 32, 33. This induces voltage across secondary windings 34, 36 which increases the voltage applied to the load to the sum of the input voltage at lines 10, 12 and 14 plus the voltage produced across the secondary windings. Thus the voltage applied to the load 50 remains at its former value even though the input voltage from the supply mains 10, 12, 14 has dropped. Lamp 58 lights when voltage is thus induced in secondary winding 34.

When switch contact sets 54 and 60 are manually closed, switch contact set 40 is opened. When closed, switch contact sets 54 and 60 will effectively short circuit the secondary windings 28, 30. When switch contact set 40 is open the voltage path to primary windings 32 and 33 will be open. This will prevent the primary windings from being energized and will permit an effective bypass of the secondary windings in the event of failure of any windings of the transformer or of the voltage sensitive relay coil 18.

Figure 2:
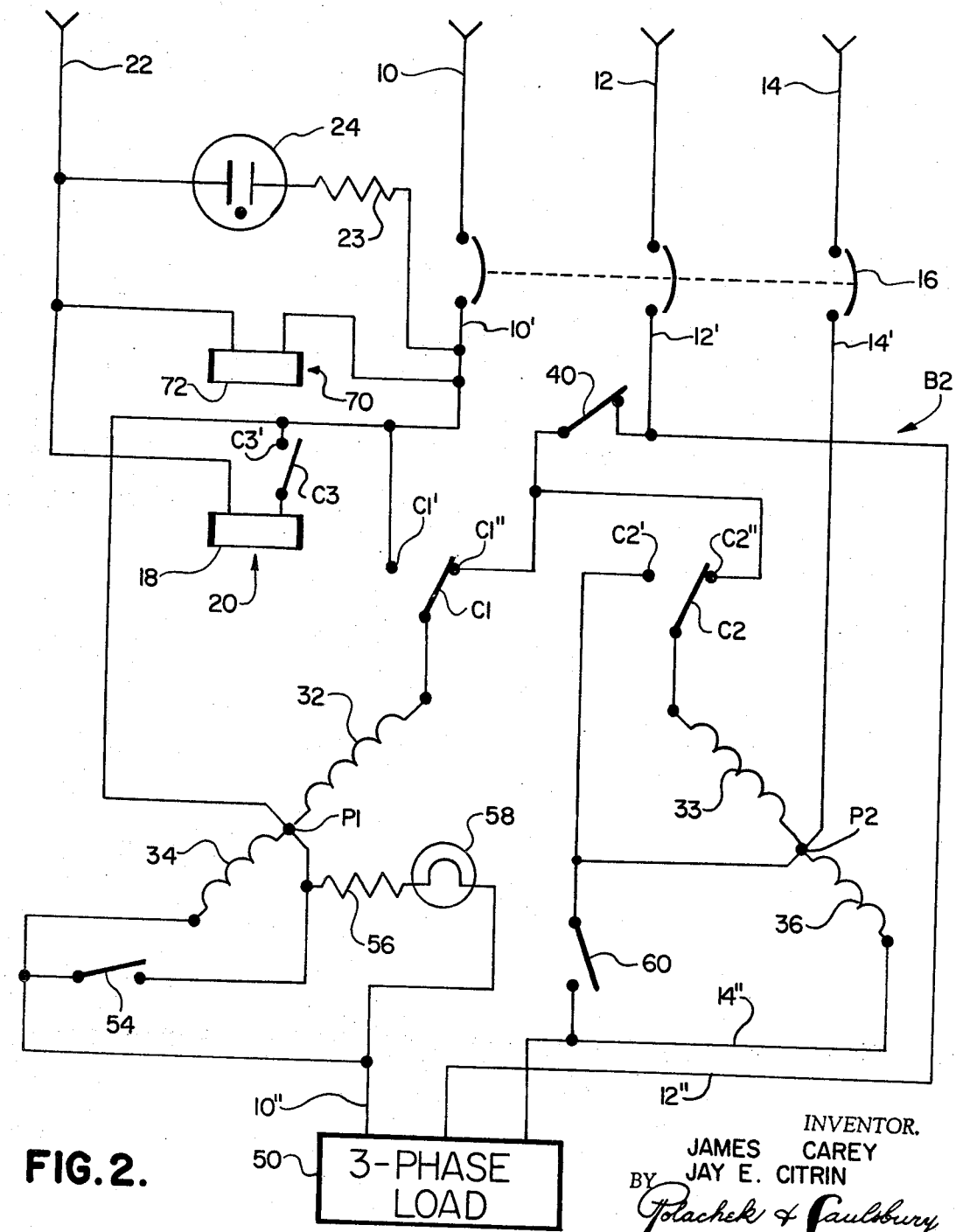
FIG. 2 is a schematic similar to FIG. 1 using a pilot relay.

The circuit B2 of FIG. 2 is similar to circuit B1 of FIG. 1 and corresponding parts are identically numbered. In the circuit of FIG. 2 an undervoltage sensitive relay 70 is employed to actuate relay 20. Relay 70 has a coil 72 connected between neutral line 22 and line 10. Normally closed contacts C3, C3' of the relay are connected in series with line 10' and relay coil 18. All other connections of the circuit are the same as shown and described in connection with FIG. 1. In operation of circuit B2, undervoltage relay 70 serves as a pilot relay. When normal rated voltage is applied to mains 10, 12, 14 relay contacts C3, C3' remain closed and relay 20 is energized to close contacts C1, C1' and C2, C2' as described above in connection with circuit B1. If the voltage at mains 10, 12 and 14 drops by any predetermined amount, 1 percent, 2 percent or 3 percent for examples, then relay coil 72 is deactivated to open contacts C3, C3'. This deenergizes relay coil 18 and the contacts of relay 20 assume the positions shown in FIG. 2. These positions are the same as shown and described in connection with FIG. 1. Operation of circuit B2 is otherwise the same as described above so this description need not be repeated.

It will be noted that the circuits B1 and B2 are characterized by their relative simplicity. This makes them relatively economical to manufacture, simplifies installation and minimizes servicing. While the invention has been shown embodied in a three-phase system, it will be apparent that the invention can readily be adapted and applied to a single phase system by omitting transformer 30, relay contacts C2, C2', C2''; and lines 14, 14', 14''. In all forms of the invention the load always remains connected to the source of power with the voltage booster serving to increase voltage when it falls to a predetermined level.

While a limited number of embodiments of the invention have been described, it will be apparent that many modifications and variations are possible without departing from the invention as defined in the appended claims.

What is claimed is:

1. An automatic voltage booster for an alternating current power supply to a load, comprising a plurality of power input lines; an autotransformer having primary and secondary windings connected together at a junction point, one of said lines being connected to said junction point; said secondary having a terminal for connection to said load; a relay having a coil connected in circuit with said lines, normally open first contacts and normally closed second contacts arranged to be closed and opened respectively when said coil is energized by voltage supplied by said lines at not less than a predetermined magnitude of supply voltage, said normally open first contacts being connected across said primary winding for short circuiting the same when the first contacts are closed, said normally closed second contacts being connected between a free end of said primary winding and a second one of said lines for de-energizing the primary winding when said second contacts are opened, said second line having a terminal for connection to said load, whereby said load is energized by voltage supplied by said power supply lines via said secondary winding at all times, and whereby a voltage is induced in said secondary winding when the first contacts close and second contacts open upon reduction of the supply voltage below said predetermined magnitude, so that voltage supplied to the load is then equal to the sum of the voltage induced in said secondary winding and the reduced supply voltage and has a magnitude not less than said predetermined magnitude; a second autotransformer having another primary winding and another second winding connected together at another junction point, a third one of said lines being connected to said other junction point; said other secondary winding having a terminal for connection to said load; said relay having normally open third contacts and normally closed fourth contacts arranged to be closed and opened respectively when said coil is energized by voltage supplied thereto at not less than said predetermined magnitude, said normally open third contacts being connected across said other primary winding for short circuiting the same when the third contacts are closed, said normally closed fourth contacts being connected between a free end of said other primary winding and said second line for de-energizing said other primary winding when the fourth contacts are opened, whereby said load is energized by voltage supplied by said power supply lines via both secondary windings at all times, and whereby a voltage is induced in secondary winding when the third contacts close and fourth contacts open upon reduction of the supply voltage below said predetermined magnitude so that voltage induced in the secondary windings and the reduced supply voltage and has a magnitude not less than said predetermined magnitude; and a switch with first normally closed contacts connected in series with said second power input line, second normally open contacts connected across the first named secondary winding, and third normally open contacts connected across the other secondary winding, whereby said power supply is cut off from the primary windings when the first contacts are open, and whereby the secondary windings are short circuited when the second and third contacts are closed, in the event of failure of either relays or of a part of either transformer, so power is continuously supplied to the load.

2. An automatic voltage booster as defined in claim 1, further comprising a second relay having another coil connected in circuit with said lines, said second relay having other normally open contacts connected in circuit with the coil of the first named relay and with said lines for energizing the first named relay coil when said supply voltage has a magnitude not less than said predetermined magnitude to close the normally open first contacts and open the normally closed second contacts, said coil of the second relay being sensitive to the supply voltage to open said other normally closed contacts when the magnitude of the supply voltage drops below said predetermined magnitude.

3. An automatic voltage booster as defined in claim 1, further comprising a lamp connected across said secondary winding to indicate that the same is energized.

4. An automatic voltage booster as defined in claim 1, further comprising a first lamp connected across one of said secondary windings to indicate that the same is energized, and a lamp connected across certain ones of the lines to indicate that power is supplied to said relay.

5. An automatic voltage booster as defined in claim 1, further comprising a series resistor connected in the circuit to limit the voltage potential to the desired level.

* * * * *